O. E. HUEBNER.
MEANS FOR ESTABLISHING AUXILIARY CONVECTION IN LIQUID CONTAINERS.
APPLICATION FILED JAN. 23, 1915.

1,350,728.

Patented Aug. 24, 1920.

Inventor
Otto E. Huebner.

Witnesses

By
Attorney

UNITED STATES PATENT OFFICE.

OTTO E. HUEBNER, OF BROOKLYN, NEW YORK.

MEANS FOR ESTABLISHING AUXILIARY CONVECTION IN LIQUID-CONTAINERS.

1,350,728.  Specification of Letters Patent.  Patented Aug. 24, 1920.

Application filed January 23, 1915. Serial No. 4,001.

*To all whom it may concern:*

Be it known that I, OTTO E. HUEBNER, a citizen of the United States, residing at Brooklyn, in the county of Kings and State of New York, have invented certain new and useful Improvements in Means for Establishing Auxiliary Convection in Liquid-Containers, of which the following is a specification.

This invention relates to auxiliary means usable in conjunction with kettles, pots, boilers or like culinary vessels in which it is desired to bring the liquid contained therein to the boiling point by proximity of such vessel to a source of heat, for the purpose of hastening the reaching of such boiling point by the liquid through an unusual and forced circulation of such liquid from the points where it is most rapidly heated through the colder portions thereof.

The above and additional objects which will become apparent as this explanatory description proceeds, are accomplished by such means as are illustrated in the accompanying drawings, described in the following specification and then more particularly pointed out in the claims which are appended hereto and form a part of this application.

Figure 1:
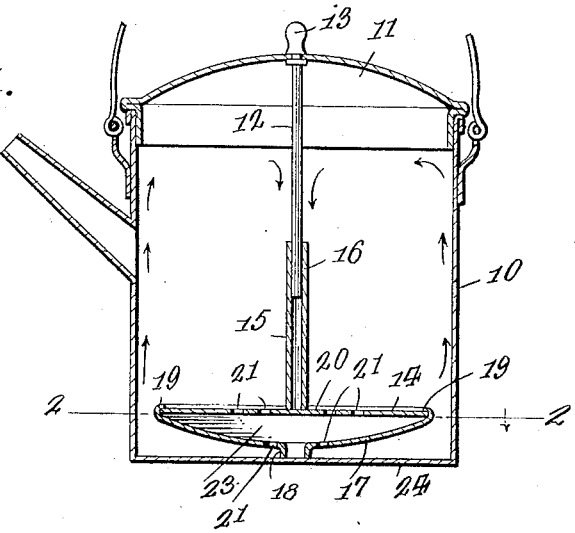
Figure 2:
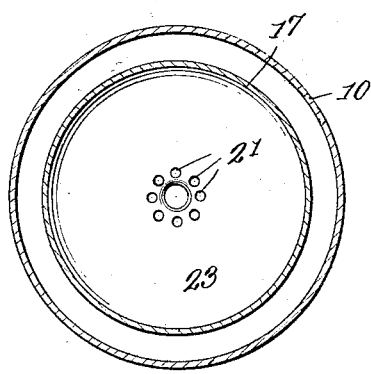

With reference to the drawings, wherein there is illustrated the preferred embodiment of this invention as it is reduced to practice, and throughout the several views of which like characters of reference designate similar parts:

Figure 1 is a vertical section taken through a container equipped with one of the forms of this invention, Fig. 2 is a transverse sectional view on the line 2—2 of Fig. 1.

Referring to the figures the numeral 10 designates a kettle, pot, boiler or other culinary vessel or container provided with a cover or closure 11 through which there projects centrally the rod 12 secured by any desirable means to the handle knob 13 of the cover to extend downwardly and centrally into the container 10. A deflector plate designated as a whole by the numeral 14 is formed with the central and vertically extending stem 15 adapted to receive the inner extremity of the mentioned rod 12 in a suitable tight telescopic joint 16, in order to render such deflector adjustable with respect to the bottom of the container.

This deflector 14 is formed to include the cone-shaped lower portion 17, the ends of which are angularly flanged as indicated at 18 and 19, the former to form a bearing when the deflector is contacting with the bottom of the container and the latter to embrace the base plate 20 of the cone which in common with the portion 17 is formed with a series of apertures 21 to communicate with the chamber 23 inclosed by the cone portion 17.

In operation, the bottom 24 of the container most readily conducts heat to the strata of liquid immediately above and since heated water has a tendency to rise through water of a lower temperature superimposed thereabove, it will be apparent that the cone deflector offers but one annular path of escape to fulfil this tendency so that the convection heat waves will pass upwardly along the walls of the container to follow the line of least resistance in mingling with the colder upper portion in the manner indicated by the small arrows of Fig. 1. It should be apparent that a new and particular mode of circulation is thus provided for a device of this character, the colder water filling the chamber 23 as the warmer water is dispersed from there under and is eventually similarly acted upon in continuing the circulation. The telescopic connection 16 also permits the amount of water that is first heated to be regulated by spacing the cone deflector 17 from the bottom of the container.

What is claimed is:

1. In combination with a fluid container, a hollow body, flat on one side and convex on the other, having both sides perforated, and a nipple formed centrally on the convex side establishing communication between the exterior and the interior of the body, said body being located centrally within the container with its convex side down and the nipple adapted to rest on the bottom of the container to space the body therefrom, said body being operable to cause circulation of the fluid radially toward the walls of the container when the latter is heated from beneath, and means for adjusting said body vertically.

2. In combination, a container, an inverted cone member located centrally within the container, a tubular member extending upright from the cone member, a cover for the container, and a rod depending from the cover to enter the tubular member to support the cone member and to permit vertical adjustment of the latter.

In testimony whereof I affix my signature in presence of two witnesses.

OTTO E. HUEBNER.

Witnesses:
 E. B. RANNELLS,
 F. W. MORRIS.